United States Patent [19]

Goode et al.

[11] 3,781,473

[45] Dec. 25, 1973

[54] RANDOM DIGITAL CODE GENERATOR

[75] Inventors: George E. Goode, Richardson; Kenneth M. Branscome, Dallas, both of Tex.

[73] Assignee: Datotek, Inc., Dallas, Tex.

[22] Filed: Apr. 15, 1971

[21] Appl. No.: 134,320

[52] U.S. Cl. .................................................. 178/22
[51] Int. Cl. .......................... H04k 1/00, H041 9/04
[58] Field of Search ...................................... 178/22

[56] References Cited

UNITED STATES PATENTS

| | | | |
|---|---|---|---|
| 3,051,783 | 8/1962 | Hell et al. | 178/22 |
| 3,038,028 | 5/1962 | Henze | 178/22 |
| 3,506,783 | 4/1970 | Mo et al. | 178/22 |
| 3,557,307 | 1/1971 | Florin et al. | 178/22 |
| 3,170,033 | 2/1965 | Vasseur | 178/22 |

*Primary Examiner*—Benjamin A. Borchelt
*Assistant Examiner*—H. A. Birmiel
*Attorney*—Richards, Harris & Hubbard

[57] ABSTRACT

The specification discloses a random code generator for generating a randomized digital key stream. A plurality of shift registers are each operable to generate a randomized digital signal, the cycle period of each of the shift registers being prime to one another. Nonlinear combining circuitry receives and combines the digital signals generated by the shift registers for production of a randomized digital key stream. Mode control circuitry is responsive to the key stream for randomly varying the interconnection and mode of operation of the shift registers between a plurality of different modes. Circuitry is also responsive to the key stream for randomly varying the number of steps taken by the shift registers during the various modes of operation. The shift registers are operable during a priming mode to generate a random prime signal for synchronization of encoding and decoding ciphering devices. If desired, a read only memory may be connected into the generator to further randomize the digital key stream.

27 Claims, 3 Drawing Figures

INVENTORS:
GEORGE E. GOODE
KENNETH M. BRANSCOME

Richards, Harris & Hubbard
ATTORNEYS

RANDOM DIGITAL CODE GENERATOR

FIELD OF THE INVENTION

This invention relates to generation of random digital signals and particularly relates to a random digital code generator for use in a cryptographic system.

THE PRIOR ART

A variety of techniques have heretofore been developed for encoding, scrambling or enciphering data. Such prior techniques have included mechanical enciphering techniques, in addition to "table look-up" methods. More recently, enciphering techniques have been developed for automatically encoding digital text. An example of such automatic techniques is disclosed in U.S. Pat. No. 3,522,374, issued July 28, 1970.

Ciphering systems for use with digital data transmission systems such as teleprinter, Telex networks and the like have generally heretofore been based upon the modulo-2 addition of a clear text character with a randomly generated key character. In such systems, it is extremely important that the random stream of key characters have as long a cycle as possible. It is also important that accurate synchronization and priming techniques are utilized to properly synchronize the transmitting and receiving ciphering stations.

Previously developed random code generators for cryptographic systems, such as the code generator disclosed in U.S. Pat. No. 3,522,374, have generally utilized various combinations of shift register generators for production of a random digital key stream. However, in many such previously developed code generators, it has been possible to select certain combinations of shift register generator interconnections which result in undesirable short cycle periods for the generated random digital key stream. Furthermore, in prior random code generators, it has often been necessary to manually program the generator with an initial prime sequence, thereby increasing the complexity of operation of the cryptographic system and reducing the security of the system. Moreover, previously developed random code generators have not generally been completely satisfactory with respect to the digital randomization provided thereby.

SUMMARY OF THE INVENTION

In accordance with the present invention, a random code generator is provided which utilizes a plurality of autonomous sequential circuits each operable to generate a linear randomized digital signal, the cycle period of each of the sequential circuits being relatively prime to the cycle periods of the other sequential circuits. Nonlinear combining circuitry receives and nonlinearly combines the digital signals in order to generate a randomized digital key stream.

In accordance with another aspect of the invention, a random code generator includes a plurality of autonomous sequential circuits, along with circuitry for interconnecting the sequential circuits in a plurality of different configurations for generation of randomized digital signal. Circuitry is also provided to control the interconnecting circuitry in a random manner in order to randomly vary the interconnections of the sequential circuits.

In accordance with yet another aspect of the invention, a random code generator includes a plurality of autonomous sequential circuits each operable to generate randomized digital signals. Circuitry is provided to randomly control the number of sequential steps taken by the sequential circuits between the generation of successive random digital signals.

In accordance with another aspect of the invention, a random code generator includes a random prime generation circuit including a cyclic sequential stepping circuit operable to generate digital bits during an idle mode. Circuitry is provided to terminate the circulation of the stepping circuit, wherein random prime digital bits are stored in the stepping circuit after termination of the circulation.

In yet a more specific aspect of the present invention, a random code generator for use with a digital cryptographic system includes a plurality of autonomous sequential circuits each operable to generate a randomized linear digital signal. The cycle periods of each of the sequential circuits are prime to one another. Nonlinear combining circuitry receives and nonlinearly combines the various linear digital signals to generate a randomized digital key stream. Circuitry is responsive to the key stream for randomly varying the interconnections and the mode of operation of the sequential circuits. Circuitry is provided to randomly vary the number of steps taken by the sequential circuits between successive signal generations. Circuitry is also provided to operate the sequential circuits to generate a randon prime signal prior to generation of the key stream.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
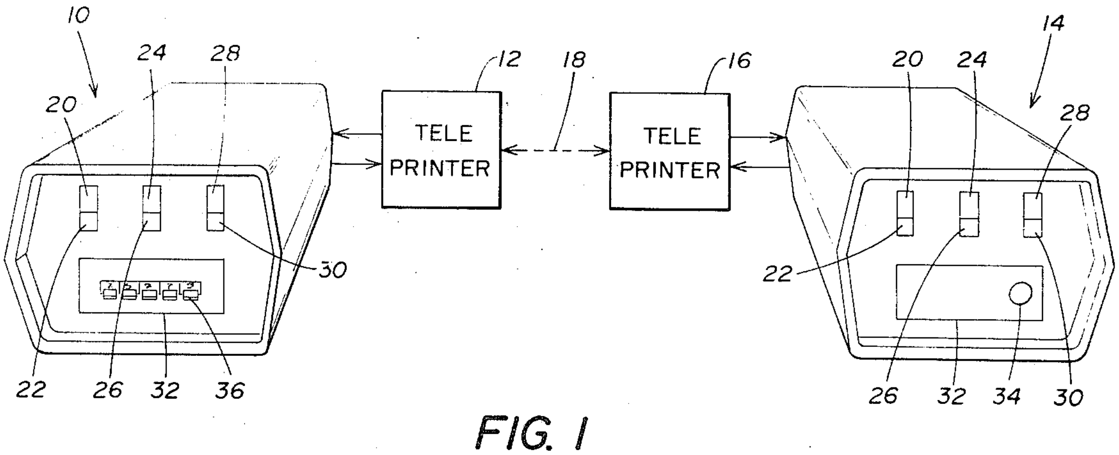
FIG. 1 is a block diagram of a typical ciphering system installation which utilizes the present random code generator.

Referring to FIG. 1, a block diagram of a ciphering system utilized with a teleprinter network is illustrated. A first ciphering device 10 is interconnected with a conventional teleprinter 12 at one station, while a second identical ciphering device 14 is interconnected with a teleprinter 16 at a remote second location. A Telex or TWX communication channel 18 connects the teleprinters 12 and 16 in the conventional manner. A typical teleprinter unit such as ASR-33 may be utilized with the present invention for operation with 8-level punch paper tape. However, in the preferred embodiment to be described, the teleprinters 12 and 16 operate on a 5-level data for transmission on a network such as the Western Union Telex network.

Each of the ciphering devices 10 and 14 includes a Power On button switch 20 and an Alarm Reset button switch 22. An Encode button switch 24 may be depressed to encode data while a Decode button switch 26 may be depressed to decode data. Lamps are disposed behind each of the buttons 20–26 to indicate the operation mode of the device. A light 28 is illuminated when the system is operating in the private or coding mode, while a light 30 is illuminated when a system is operating in the clear or uncoding mode.

In operation of the system, one of the ciphering devices is placed in the encode mode and the other of the devices is placed in the decode mode. Both devices are connected offline from the teleprinters and do not thus interfere with the normal operation of the teleprinters. However, the data transmitted over the communications line 18 will be ciphered and will be unintelligible without the properly synchronized mating ciphering device at the receiving end.

A door 32, shown in place on device 14, is provided on the front of each of the devices 10 and 14 and includes a lock 34 which must be unlocked by a suitable key before the door 32 may be removed. A plurality of multiple position circular thumbwheel switches 36, shown on device 10, are disposed behind each door 32. The thumbwheel switches 36 may be individually manually rotated to provide any one of a large number of different combinations in order to select the particular code for the day used in the ciphering process. The identical code for the day must be set into each of the devices 10 and 14 before data may be enciphered and deciphered by the system.

Figure 2:
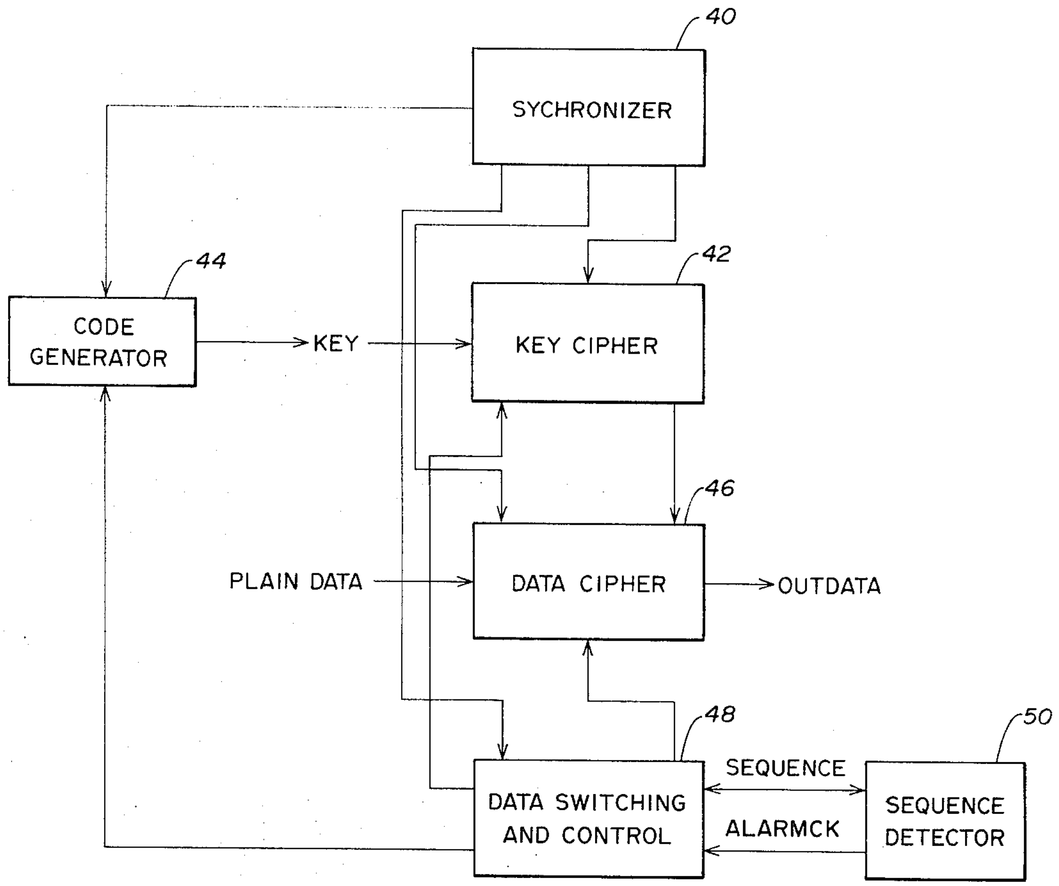
FIG. 2 is a block diagram of one of the ciphering devices shown in FIG. 1 which includes the present random code generator.

FIG. 2 illustrates a block diagram of the basic sections of the ciphering devices 10 and 14. A synchronizer circuit 40 provides a plurality of synchronizIng clock outputs for controlling the operation of the cipher operation. Timing signals from the synchronizer 40 are applied to the key cipher circuitry 42. The key cipher circuitry 42 receives pseudorandom key data from the random code generator 44 of the invention which is also controlled by synchronizing pulses from the synchronizer 40. The key cipher circuitry 42 operates in response to the key data to generate a limit signal which is applied to the data cipher circuitry 46. The data cipher circuitry receives plain text data and enciphers that plain text data in response to the limit signal from the key cipher circuitry 42. The enciphered data is then output from the data cipher circuitry 46.

In the encode mode, the data cipher circuitry 46 operates in the reverse manner to receive ciphered data and to output clear text data. A data switching and control circuit 48 provides timing waveforms for controlling the mode of operation of the system. A sequence detector 50 checks the operation of the system to insure that clear text is not being generated due to a malfunction of the system. If a malfunction occurs, the sequence detector 50 generates an alarm signal through the data switching and control circuit 48 to place the system in an alarm state.

For a more detailed description of the construction and operation of the cryptographic system shown in FIGS. 1 and 2, reference is made to the copending patent application Ser. No. 134,319, filed Apr. 15, 1971, and entitled DIGITAL DATA CIPHERING TECHNIQUE (B1931).

Figure 3:
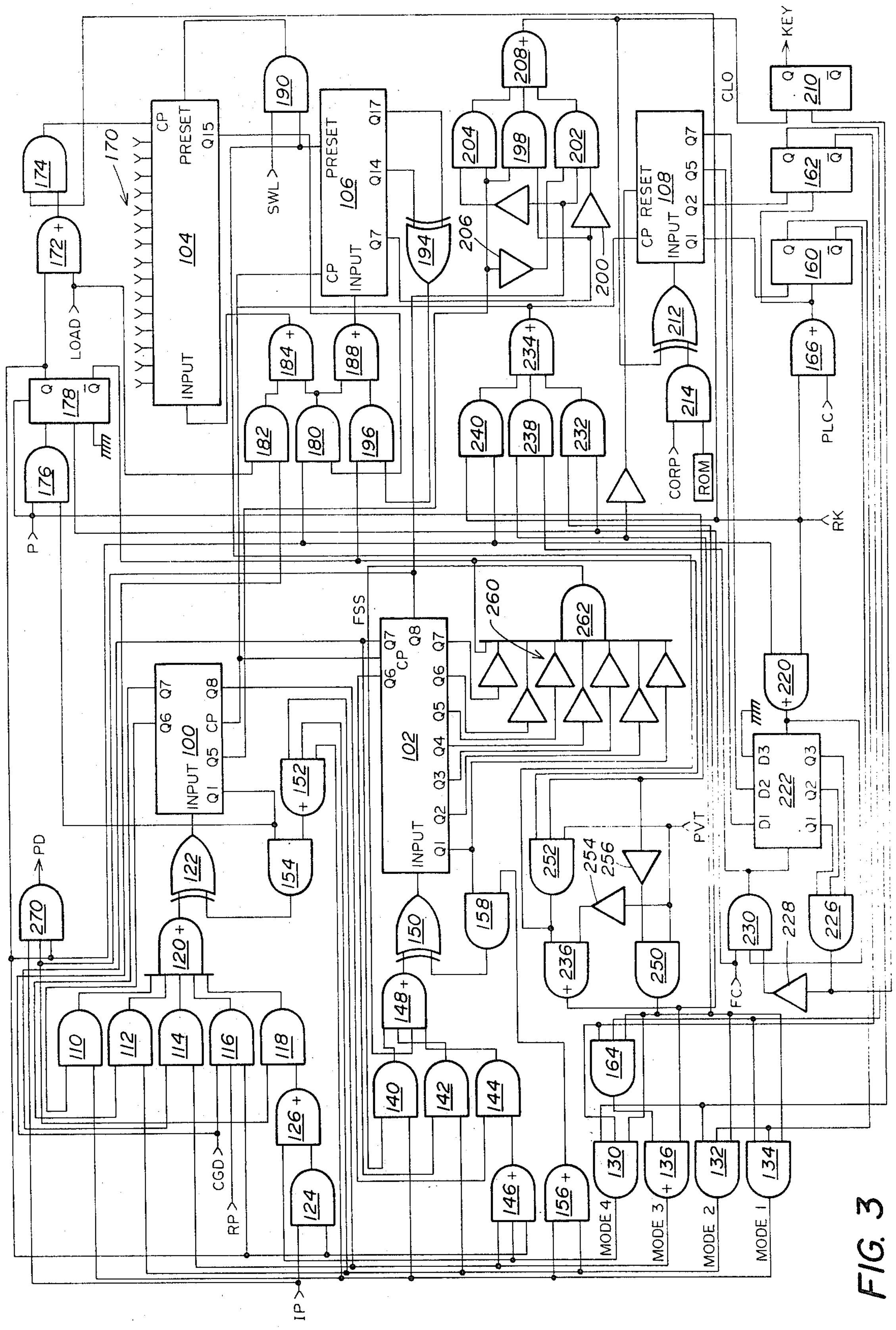
FIG. 3 is a block diagram of the preferred embodiment of the present random code generator.

FIG. 3 illustrates in schematic detail the random code generator of the present invention. Basically, the random code generator utilizes a plurality of autonomous sequential stepping circuits, such as shift registers, which are randomly interconnected in various control modes in order to generate streams of linear random numbers. In the preferred illustrated embodiment, five shift registers are utilized, although it will be understood that additional and larger capacity shift registers could be utilized to increase both the complexity and the cycle period of the random words generated by the system.

The system shown in FIG. 3 includes a pair of 8-stage shift registers 100 and 102 which are interconnected in a variety of modes to perform randomizing functions. Register 104 is a 15-stage shift register utilized as the Load register. Register 106 is a 17-stage shift register utilized as a Code for the Day register, while register 108 comprises and 8-stage shift register utilized as Mode Control register. The Mode Control register 108 directly controls the configuration of registers 100 and 102 in four different operational modes and in Prime and Idle modes.

In operational Mode 1, register 100 is interconnected as a 6-stage shift register generator and register 102 is interconnected as a 7-stage shift register generator. In Mode 2, register 100 is interconnected as a 7-stage shift register generator, while register 102 is interconnected as a 6-stage shift register generator. In Mode 3, registers 100 and 102 are interconnected as a single 15-stage maximal length shift register generator. In Mode 4, registers 100 and 102 are interconnected as a 16-stage circulating register.

In the Prime mode of operation, registers 100 and 102 are interconnected as a circulating 16-stage register, with a digital "one" bit being forced into the register to prevent the register from "hanging up" from all digital "zeros." In the idle mode of operation, registers 100 and 102 are interconnected in the same manner as Mode 3 to provide a 15-stage shift register generator.

In the description of the random code generator shown in FIG. 3, a number of input and output signals will be referred to. In order to assist in the understanding of the circuitry, the symbols for the signals are explained as follows:

PLC – Prime and load operations complete
RK – Request for key
PVT – Private mode
P – Prime mode
FC – Fast clock
CORp – Switches the read only memory (ROM) in and out of the system
SWL – Obtain load from the thumbwheel switches 36
LOAD – Load the code for the day from the keyboard
CGD – Code generator data (load or prime)
IP – Initiate prime
RR – Receive prime
FSS – Insure that more than seven consecutive zeros do not cause the registers to "hang up"
PD – Prime Data
KEY – Random key stream output Referring again to FIG. 3, AND gates 110-118 are connected to the input of an OR gate 120 in order to provide mode control to the register 100. The output of gate 120 is connected to an input of an exclusive OR gate 122 which is connected to a terminal of register 100. The CGD and RP signals are directly applied to inputs of AND gate 116 from the external controller 48. The IP signal is applied to one input of an AND gate 124, the output of which is connected to an OR gate 126. The output of gate 126 is connected to an input of the gate 118. The output from AND gates 130–134 and OR gate 136 are connected to respective inputs of gates 110, 112, 114 and 126 to provide random mode control for register 100.

AND gates 140–144 and OR gates 146–148 receive inputs from the mode control gates 130–136 in order to control, through the exclusive OR gate 150, the various operation modes of the register 102. Mode control inputs are also applied through an OR gate 152 and an AND gate 154 for mode control of the register 100. In a similar manner, OR gate 156 receives mode control inputs and is connected to an AND gate 158 for additional mode control of the register 102.

Mode control for the registers 100 and 102 is derived from the randomized outputs of the mode control register 108. These outputs control the states of flipflops 160 and 162. The Q and $\overline{Q}$ terminals of flipflop 160 are directly connected to the inputs of gates 130, 132 and 134 and through an AND gate 164 to the input of gate 136. The Q and $\overline{Q}$ terminals of flipflop 162 are directly connected to the inputs of gates 130, 132 and 134, and through AND gate 164 to the input of OR gate 136. The PLC and RK signals are applied through an OR gate 166 to the CP terminal of flipflop 160.

The Load register 104 is connected to accept the code for the day from the thumbwheel switches 36. Thumbwheel switches 36 are directly connected to the inputs 170 of the register 104. The binary coded thumbwheel switches are manually operated to set up the binary numbers 0–7 on inputs 170. Each successive group of three of the inputs 170 comprises one binary number. For instance, if the binary number 1 is set into the first thumbwheel switch, the binary number 001 will be set up on the first three inputs of the register 104. By proper operation of the thumbwheel switches 36, five 3-bit binary numbers are loaded into the register 104.

Alternatively, the load register 104 may be loaded directly from the teleprinter keyboard by applying the keyboard binary information to the CGD input through AND gate 182 and OR gate 184 to the serial input of register 104. It will thus be seen that a large number of different codes may be initially loaded into the register 104. It will also be understood that by increasing the capacity of the load register 104 and the remaining registers of the system, that the system can operate with larger digital words and thereby provide an additional degree of complexity and security.

An AND gate 176 detects the state of the Q1 terminal of the register 100 to insure that the register has a digital "1" therein prior to allowing the system to go into Prime mode. The output of gate 176 controls the J-terminal of a flipflop 178. The Q terminal of flipflop 178 generates a prime control signal which is applied to an input of the OR gate 172.

The information contained in the Load register 104 must be transferred to the Code for the Day register 106 in a serial manner. The output from register 104 is applied to an input of an AND gate 180 which is controlled by the prime condition signal applied from the Q terminal of flipflop 178. The LOAD signal is applied to an input of an AND gate 182, and the outputs of gates 180 and 182 are applied through an OR gate 184 which operates to control the register 104. The output of AND gate 180 is applied through an OR gate 188 which is connected to the input of register 106 for loading thereof.

The preset terminal of register 104 is connected to the output of an AND gate 190, which is connected to receive the SWL signal. The other terminal in gate 190 is connected to the preset terminal of the register 106. The code for the day information initially entered into the Load register 104 may be then serially transferred through gates 180 and 188 to the Code For the Day register 106. At the same time, the information from the register 104 is applied through gates 180 and 184 back into the input of register 104. In this manner, once a load is set into register 104, additional loading will not be required until such time as it is wished to change the code for the day, when a keyboard entered code for the day is being utilized.

The Q14 and Q17 terminals of the Code for the Day register 106 are modulo-2 added by an exclusive OR gate 194. The output of gate 194 is applied to an input of a gate 196, the output of which is connected to an input of gate 188. Register 106 may thus be connected as a maximal length shift register generator for operation upon the code for the day. The Q7 terminal of the Code for the Day register 106 is connected to an input of an AND gate 198 and through an inverter 200 to the input of a three input AND gate 202.

The Q5 terminal of the register 100 is connected to an input of an AND gate 204 and through an inverter 206 to an input of gate 202. The Q8 terminal of register 102 is connected to the input of gate 202 and through an inverter to an input of gate 204. The outputs of gates 198, 202 and 204 are applied to the inputs of an OR gate 208, the output of which is applied to a flipflop 210 and to the input of an exclusive OR gate 212.

The CORP and ROM signals are applied through an AND gate 214 to the second input of the exclusive OR gate 212. The ROM comprises a read only memory device which may be selectively switched into the random code generator to increase the randomization thereof, if desired. In practice, the Read Only Memory (ROM) comprises a small module which may be plugged into the rear of the casing of the ciphering devices shown in FIG. 1. Each user may devise a unique code to encode the ROM, in order to individualize the ciphering units as desired. The Q terminal of the flipflop 210 generates the random KEY signal for application to the key cipher circuitry 42 as shown in FIG. 2.

Gates 198, 202, 204 and 208 operate as Nonlinear Combining Logic to generate the combining logic output (CLO) signal which becomed the actual key bit transmitted by the flipflop 210. The Nonlinear Combining Logic is interconnected according to a Karnaugh map which is configured to have the same number of ones and zeros available, so that the probability pattern in the KEY output will be equal for a one or a zero. Flipflop 210 prevents the key output from having excessive noise thereon.

The RK signal is applied through an OR gate 220 which is connected to the preset terminal of a 3-stage binary preset counter 222. The Q5 and Q7 terminals of the register 108 are interconnected to the inputs of the counter 222 to insure that the counter 222 always has at least one zero input thereto. The counter 222 operates to generate a random number of steps between the key bits generated by the system shown in FIG. 3. This random number will be from 4—7 steps, depending upon the state of terminals Q5 and Q7 of the register 108. The Q1, Q2, and Q3 terminals of the counter 222 are interconnected to an AND gate 226 which detects the presence of a binary seven (or three digital ones) within the counter 222.

Gate 226 is connected through an inverter 228 for control of an AND gate 230, which also receives the FC signal. The FC signal is also applied to an input of an AND gate 232, the output of which is connected to an OR gate 234. The second input of the gate 232 is interconnected to the input of an OR gate 236. The output of gate 230 is applied as an input to an AND gate 238, the output of which is connected to gate 234. The RK and PC signals are applied to the inputs of an AND gate 240, the output of which is interconnected with gate 234. Gates 232, 234, 238, and 240 control the operation of the system clock in either the Idle, Code, or Prime modes, and applies clock pulses for operation of the system in the various modes.

The PVT signal is applied to an input of an AND gate 250, the output of which is connected to inputs of gates 132, 134 and 164. The PVT signal is also directly applied to an input of an AND gate 252 and through an inverter 254 to an input of gate 236. The Prime signal is applied through an inverter 256 to another input of gate 252.

The output terminals of the register 102 are applied through a plurality of inverters 260 to the inputs of an AND gate 262. The output of gate 262 comprises the FSS signal which insures that no more than seven zeros in succession are output from the register 102. The IP signal is applied to an AND gate 270 which generates the PD signal which is the prime data for the remote ciphering device. An output from register 102 and from flipflop 178 is also applied as an input to gate 270.

OPERATION OF THE CODE GENERATOR

In initial operation of the random code generator shown in FIG. 3, the Code for the Day is loaded into the Load register 104 in the manner previously described, either from the teleprinter keyboard through gates 182 and 184, or by operation of the thumbwheel switches 36. If the thumbwheel switches are used, the SWL pulse loads five characters comprising three binary bits each into the register 104 to comprise the Code for the Day.

During this time, registers 100 and 102 are operating in the Idle mode as a 15-stage shift register, and are thus circulating the output from register 100 into the input of register 102 and the output of register 102 into the input of register 100. In the Initiate Prime mode, the IP signal causes the registers 100 and 102 to cease operating in the Idle mode and the digital information contained in register 102 is fed from terminal Q8 of register 102 through gates 118, 120 and 122 to the input of register 100. The first 15 bits thus fed into register 100 comprise the random Prime Data. The Prime Data applied to register 100 from register 102 is gated by the PC and IP signals.

Additionally, during the Initiate Prime operation, the Code for the Day data contained in register 104 is serially shifted down into register 106 through gates 180 and 188. Gate 180 is controlled by the Prime signal P which is applied to the flipflop 178. In addition, the Code for the Day data is circulated through gates 180 and 184 back to Load register 104 to eliminate the requirement for further loading until the Code for the Day is changed.

It will thus be seen that the present system automatically generates a random priming signal, due to the fact that registers 100 and 102 are initially cycling as a maximal length 15-stage shift register generator during the Idle mode. When the Idle mode is terminated, the resulting 15 bits contained in register 102 are random in nature. When the code generator is being operated in the Initiate Prime (IP) mode, the prime data is transmitted via gate 270 as the PD signal. The PD signal is received by a mating ciphering device operating in the Receving Prime mode to synchronize the operation of the two ciphering devices.

When the random code generator shown in FIG. 3 is operating in the Receive Prime (RP) mode, the IP signal applied to gate 124 is turned off, and thus the output from the register 102 is not applied back to register 100, but is merely dumped from the output of register 102. The Prime Data (PD) which comprises the 15 prime digital bits transmitted from the remote ciphering device is input as the CGD input through gates 116, 120 and 122 for storage in registers 100 and 102 as the Prime data. In this manner, the registers 100 and 102 of both ciphering devices are loaded with the identical Prime data. Thus, the random code generators in both ciphering devices begin operation with the identical Code for the Day input and the identical Prime data, and continue thereafter to generate identical random digital key streams.

In order to guarantee that registers 100 and 102 are correctly primed, the condition of a digital one is forced into terminal Q8 of register 102. To accomplish this, the code generator is not allowed to be initiated into Prime mode until a digital one is located at terminal Q1 of register 100. If the digital one is located in terminal Q1 of register 100, after taking 15 steps upon reception of the prime information, terminal Q8 of register 102 will always be a one.

The detection of a digital one in terminal Q1 of register 100 is acomplished by gate 176 and flipflop 178. The signal P applied to gate 176 will go high to enable the gate 176 as soon as the terminal Q1 of register 100 has a digital one therein. This will cause the J input of the flipflop 178 to go high, and thus the next fast clock pulse will cause the flipflop 178 to turn on. This generates the signal PC from the Q terminal of the flipflop 178, in order to allow the generator to go into the Prime mode. Flipflop 178 stays on as long as the P signal is high.

To place the system in the Prime mode, the signal PVT is applied to gate 250 and the signal P is applied to gate 176 from the circuitry shown in FIG. 2. When signal P comes on, the gate 176 is enabled to take the reset off of flipflop 178. As soon as terminal Q1 of the register 100 becomes a digital one, gate 176 is enabled to place the gate input to flipflop 178 high. The next fast clock pulse (FC) applied to the system turns the flipflop 178 "on" to thereby allow the system to actively go into the Prime mode.

During the time that the system is in the Prime mode, with the flipflop 178 turned on and operating in the Prime mode, the FSS signal is inhibited and will thus not affect the data in the system. The FSS signal is allowed to operate only when the system is actually coding data after the priming condition is accomplished.

Assuming that the system shown in FIG. 3 is encoding data and that the remotely located decoding ciphering device has been properly synchronized with Prime data, both code generators then begin to operate to generate randomized key data. Once the Priming mode is terminated, the register 106 becomes a 17-stage shift register generator, with the exclusive OR gate 194 combining the Q14 and Q17 outputs of the register 106 and feeding back the data through gate 188 to the register 106. Register 106 thus acts as a maximal shift register generator throughout all encoding operations.

The gates 198, 202, 204 and 208 operate as Nonlinear Combining Logic to combine the linear output data generated from the registers 100, 102 and 106 in a nonlinear manner, in order to generate a nonlinear randomized signal term CLO which is applied to flipflop 210 to generate the key bit signals. As previously noted, the Nonlinear Combining Logic operates according to a Karnaugh map which is set to have exactly the same number of ones and zeros available to provide even probabilities of obtaining either a one or zero. This nonlinear combination of outputs from a plurality of randomly generated linear networks provides a very secure randomized output for the system.

An important aspect of the system is that the state of operation of the Mode Control register 108 is utilized to control the reconfiguration of registers 100 and 102, as well as the 3-stage binary preset counter 222. The CLO output is directly applied from the output of gate 208 through gate 212 to the input of register 108. In some cases, it will be desired to utilize the Read Only Memory (ROM) in order to further randomize the input into the register 108 according to a modulo-2 addition by gate 212.

As previously noted, the flipflops 160 and 162 operate as memory flipflop circuits for the state of terminals Q1 and Q2 of register 108. Flipflops 160 and 162 are clocked in accordance with the RK signal. The outputs of the flipflops 160 and 162 thus correspond with the latest randomized bit sequence generated as the KEY signal. The outputs of flipflops 160 and 162 are utilized to control the mode control gates 130–136 to determine the mode of operation of the registers 100 and 102.

The four possible modes of operation of the registers 100 and 102 have been previously described. The outputs of flipflops 160 and 162 thus randomly configure the registers 100 and 102 as separate shift register generators, as a single large shift register generator or as a single circulating shift register. This randomizing feature of the system operates to generate an extremely secure random key stream.

Another important aspect of the invention is that the random digital bits occurring on terminals Q5 and Q7 of the register are applied to control the operation of the 3-stage binary preset counter 222. The purpose of counter 222 is to generate a random number of steps that the code generator system takes between the generation of code bits. In other words, the code generator system does not just take a single step on each register between the generation of key bits, but will rather take a random number of steps. This random number will range from 4–7 steps depending on the state of Q5 and Q7 on the register 108. The number of random steps can be increased by increasing the size of counter 222.

In operation, the RK pulse signals the code generator system that it desires another key bit. The generation of the RK signal causes the counter 222 to have set into its three stages the state of terminals Q5 and Q7 of register 108. The third terminal of the counter 222 always has a zero set into it to guarantee that if the other two terminals are set with ones, the counter 222 will take at least four steps. After RK signals the system to provide a key bit, the counter 222 generates either 4, 5, 6 or 7 pulses. The pulses are applied to registers 100, 102, 106 and 108 simultaneously to cause each of the registers to take the 4, 5, 6 or 7 steps.

In operation of the counter 222, random numbers are applied to the first two terminals of the counter while holding the third input at zero level. Gate 220 gates the Prime condition and RK signals into the counter 222. As long as the Prime condition or RK signals are present, the preset of the counter is held high to prevent the counter from stepping. Therefore, as soon as the Prime condition or RK terminates, the counter 222 will be preset with the binary number corresponding to the states of Q5 and Q7 of register 108, and automatically takes the number of steps necessary to put all "1's" in 222. The correct number of steps are guaranteed by the fact that gate 226 detects the states of the three outputs of the counter 222.

When the outputs of the counter each have a digital one thereon, the gate 226 turns off gate 230 which then terminates the fast clock (FC) signal. The Fast Clock signal is a high speed clock coming from the controller shown in FIG. 2. Gate 230 gates the Fast Clock pulses into the counter 222 in order to generate a random number of steps between the key bits.

When the system is not in the Prime condition or in the encoding mode, gate 136 causes the registers 100 and 102 to operate in the Idle mode. Additionally, the signal operates for a short time in the Idle mode between the time that it is switched into the Prime mode and the flipflop 178 comes on to create randomization of the system prior to priming.

The gate 240 enables the clock for operation of the system in the Prime mode. Gate 238 enables the clock for operation of the system in the Encoding mode. Gate 232 enables the clock for operation of the system in the Idle mode, wherein the registers 100 and 102 are directly operated under the FC signal.

An important aspect of the invention is the fact that the shift registers 100, 102 and 106 operate in conditions relatively prime to one another. Thus, during encoding operations involving modes 1–4, the various lengths of the shift registers 100, 102 and 106 are 6, 7, 15, 16 and 17. During the various modes of operation, the cycle lengths of the registers do not have a common divisor and thus are prime. This is a condition to insure maximum period for the key stream produced by the composite shift register generators of the invention.

Another important aspect of the present invention is the generation of the FSS signal by gate 262 to insure that the registers do not get "hung up" due to being set with all zeros. Should the first seven stages of register 102 become zeros, the FSS forces a one into the input of the register 102 at the next clock pulse.

The nonlinear combination of the linear outputs generated from the shift register generators of the invention provides an extremely secure and randomized output. The use of the Read Only Memory (ROM) provides flexible techniques for increasing the security of the randomized signal. The randomized recombination of the interconnection and mode of operation of the registers 100, 102 and 106 provides extremely randomized and secure key bit generation from the system. In addition, the randomized number of steps that the registers take between generation of key bits provides an additional randomization to the key output. The code for the day may be simply and securely changed by use of the thumbwheel switches 36 or may be entered directly from a keyboard if desired.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A code generator having different modes of operation for generating a random key stream comprising:

a plurality of autonomous sequential circuits each automatically operable during the generation of said random key stream in one mode of operation to generate generally randomized digital signals, the cycle period of each of said circuits being relatively prime to the cycle periods of the other circuits, means for automatically connecting at least two of said sequential circuits as a maximal length shift register generator for generation of long series of randomized digital signals in a second mode of operation during generation of said random key stream, and nonlinear combining circuitry for receiving and combining said digital signals in either of said two modes of operation for generation of a randomized digital key stream

2. The code generator of claim 1 wherein said sequential circuits comprise shift registers, each having a different cycle period.

3. The code generator of claim 1 and further comprising:

means operable during generation of said key stream for randomly varying the interconnection and mode of operation of said sequential circuits.

4. The code generator of claim 1 and further comprising:

a read only memory operable to generate an electrical signal for combination with said key stream generated by said nonlinear combining circuitry to provide a more randomized digital key stream.

5. The code generator of claim 1 wherein said sequential circuits comprise a plurality of shift registers and a register containing a stored code for the day.

6. The code generator of claim 5 and further comprising thumbwheel switch means for loading said code for the day into said register.

7. A random code generator for generating a stream of randomized digital signals comprising:

a plurality of autonomous sequential circuits, means for interconnecting said sequential circuits in a plurality of different configurations during the generating of said stream of randomized digital signals, each configuration operable to generate randomized digital signals, and means automatically operable during the generation of said stream for controlling said interconnecting means in a manner in order to randomly vary the interconnection of said sequential circuits.

8. The random code generator of claim 7 wherein in each said configuration, said sequential circuits have cycles which are prime to one another.

9. The random code generator of claim 7 wherein said sequential circuits comprise registers operable to be connected as shift register generators.

10. The random code generator of claim 7 wherein said sequential circuits comprise registers operable to be connected in a circulating mode.

11. A random code generator comprising:

a plurality of autonomous sequential circuits each operable to generate randomized digital signals, and means operable in response to selected portions of said randomized digital signals for randomly controlling the number of sequential steps taken by said autonomous sequential circuits between the generation of subsequent successive digital signals.

12. The random code generator of claim 11 wherein said sequential circuits comprise shift registers operable to be connected as shift register generators.

13. The random code generator of claim 11 wherein said means comprises a binary counter operated by a random digital signal.

14. In a random code generator, an automatic system for generating secure random prime data for use as an initial starting state to synchronize a remote terminal comprising:

a cyclically operable sequential stepping circuit operable to automatically generate digital bits during an idle mode, means for terminating generation of said stepping circuit, and means for automatically generating secure prime data which corresponds to digital bits stored in said stepping circuit after termination of generation.

15. The random prime generation system of claim 14 wherein said stepping circuit comprises a plurality of shift registers connected together as a shift register generator.

16. The random prime generation system of claim 15 wherein a predetermined number of digital bits are fed from the output of one of said registers to the input of another of said registers to provide prime data.

17. A random code generator for use with a digital cryptographic system comprising:

a plurality of autonomous sequential circuits each operable to generate a randomized linear digital signal, the cycle periods of each of said sequential circuits being prime to one another, nonlinear combining circuitry for receiving and combining said linear digital signals to generate a randomized digital key stream, means responsive to said digital key stream for randomly varying the interconnections and mode of operation of said sequential circuits, means for randomly varying the number of steps taken by said sequential circuits between successive signal generations, and means for operating said sequential circuits to generate a random prime signal prior to generation of said key stream.

18. The random code generator of claim 17 wherein said sequential circuits comprise shift registers operable to be connected in series and as individual shift register generators.

19. The random code generator of claim 17 and further comprising:

read only memory means for generating a signal for combination by said nonlinear combining circuitry.

20. The random code generator of claim 17 and further comprising means for preventing said sequential circuits from being hung up with identical digital bits.

21. A method of ciphering data comprising:
generating a plurality of linearly ciphered digital signals with sequential stepping circuits having cycles relatively prime to one another,
nonlinearly combining said linearly ciphered digital signals into a single random digital key stream, and
randomly varying the mode of operation and interconnections of the sequential stepping circuits during the generation of said key stream.

22. The method of claim 21 and further comprising:
randomly varying the number of steps taken by the sequential stepping circuits.

23. The method of generating random digital signals comprising:
stepping a plurality of autonomous sequential circuits to generate a plurality of random digital signals,
nonlinearly combining said random digital signals to generate a random key stream, and
randomly varying the number of subsequent steps taken by said circuits in response to said random key stream.

24. A method of automatically generating random prime data for use as an initial starting state to synchronize a remote digital cipering system comprising:
automatically generating randomized digital bits from a plurality of interconnected sequential circuits operating in an idle mode,
generating an initiate prime signal, and
terminating said generation of said randomized digital bits in response to said initiate prime signal and automatically utilizing the digital bits in said sequential circuits as prime data for digital ciphering.

25. A random code generator comprising:
a plurality of autonomous sequential circuits,
means for interconnecting said sequential circuits in a plurality of different configurations, each configuration operable to generate randomized digital signals,
means for nonlinearly combining the digital signals generated by said sequential circuits, and
means responsive to the output of said combining means for randomly controlling said interconnecting means in order to randomly vary the interconnection of said sequential circuits.

26. A random code generator comprising:
a plurality of autonomous sequential circuits each operable to generate randomized digital signals,
means for randomly controlling the number of sequential steps taken by such circuits between the generation of successive digital signals,
means for nonlinearly combining said digital signals to generate a random key stream, and
means operable in response to said random key stream for operating said controlling means.

27. In a random code generator, a random prime generation system comprising:
a cyclically operable sequential stepping circuit operable to generate digital bits during an idle mode,
means for terminating generation of said stepping circuit,
means for generating prime data which corresponds to digital bits stored in said stepping circuit after termination of generation, and
means for preventing all digital zeros from being stored as said prime data.

* * * * *